Jan. 3, 1950  C. B. SPASE  2,493,700
FRICTION CLUTCH
Filed May 8, 1946

INVENTOR:
Charles B. Spase,
BY
Bodell & Thompson
ATTORNEYS.

Patented Jan. 3, 1950

2,493,700

UNITED STATES PATENT OFFICE 2,493,700

FRICTION CLUTCH

Charles B. Spase, Nedrow, N. Y., assignor to Lipe-Rollway Corporation, Syracuse, N. Y., a corporation of New York Application May 8, 1946, Serial No. 668,104

6 Claims. (Cl. 192—99)

This invention relates to friction clutches of the type used in automotive vehicles or machines of the type wherein spring means are used to engage and hold the clutch engaged and the clutch disengaged through throw-out levers operated by a throw-out collar, which in turn is operated by a lever or pedal. It has for its object means operated by the movement of the throw-out levers under the centrifugal action, when the clutch is engaged and rotating, to augment the action of the clutch spring means, and thus to increase the holding or clutching action, as the speed of the clutch, and hence the centrifugal force, increases.

The invention consists in the novel features and in the combinations and constructions hereinafter set forth and claimed.

In describing this invention, reference is had to the accompanying drawings in which like characters designate corresponding parts in all the views.

Figure 1:
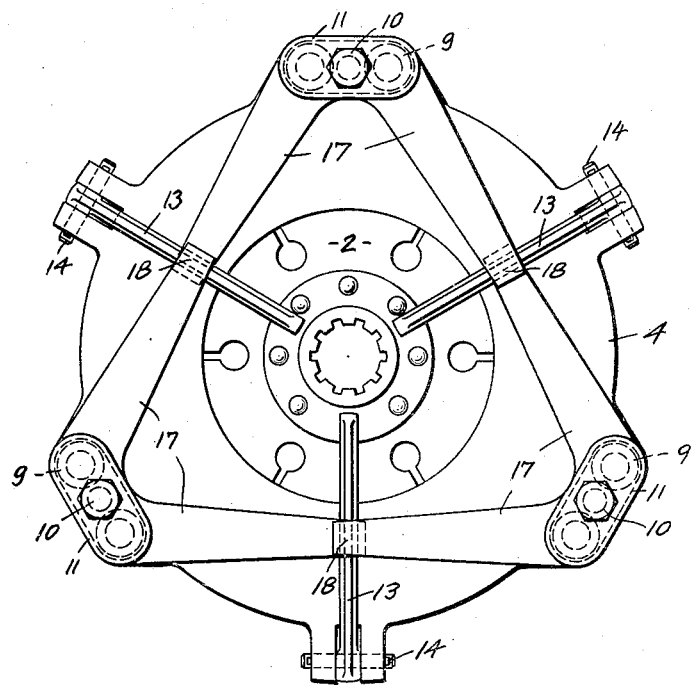
Figure 1 is a rear elevation of a clutch embodying this invention.
Figure 2:
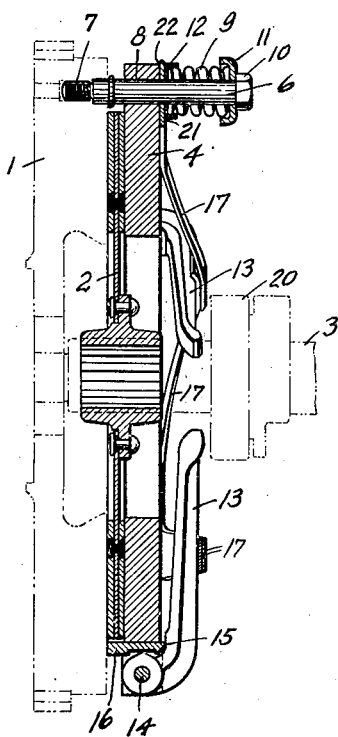
Figure 2 is a vertical sectional view taken centrally of Figure 1.

The clutch here shown is of the type embodying a unitary clutch element embodying a pressure ring, throw-out levers, clutch springs and means for attaching the pressure ring to an element, as the driving element, as shown in my co-pending application, Serial Number 630,871, filed November 26, 1945.

In the clutch here shown, 1 designates the driving element, which may be the fly wheel of an internal combustion engine. 2 designates the driven element, which is a disk or plate mounted on the clutch shaft 3. 4 is a pressure ring forming part of the driving element. 6 designates studs or bolts which thread into suitable holes at 7 in the driving element through passages 8 in the rim or in lugs at the rim of the pressure ring 4. 9 are clutch springs arranged to thrust in opposite directions against the heads 10 of the bolts and against the pressure ring, the springs 9 being loaded or compressed to thrust the pressure ring into clutching engagement. As shown, suitable spring seats 11 are interposed between the outer ends of the spring and the heads of the bolts and also the inner ends of the springs are enclosed in caps 12. These caps in turn thrust against means to be described for transferring the centrifugal force of the throw-out levers to augment the action of the springs 9.

13 designates the throw-out levers, these being pivoted or fulcrumed at 14 to the rim of the pressure ring 4 or lugs at the rim, the arms of the levers extending radially inward and the inner ends being normally free. The arms 13 thrust at 15 against the ends of the transversely sliding pins 16 which slide through the margin of the pressure ring and press against the face of the driving element 1 when the throw-out levers are operated to disengage the clutch. This feature forms no part of the invention but is the subject matter of the application previously referred to.

In so far as this invention is concerned, the levers 13 are merely throw-out levers.

The means for transferring the action of the centrifugal force is here shown as additional levers 17 having inwardly-extending arms, the arms of the different levers lapping each other and also arranged in the path of the levers 13 during their action under the centrifugal force of the rotating clutch. The levers 17 have fulcrum points and the work delivery points spaced apart along the levers to transfer the action of the levers to the springs 9 to compress and hence augment the action of the springs, and also to fulcrum on either the pressure ring or the studs 6 or the heads 10 thereof. The action, in either case, is to compress or augment the springs 9. As here illustrated, the springs are arranged in pairs, and a bolt or stud 6 extends between the springs of each pair. The spring seats 11 and cups 12 are common to the springs of each pair and the levers are formed in pairs with the levers or the arms thereof arranged in a general V formation, the legs of the V formations lapping each other at 18 and the lapping ends being arranged in the path of movement of the levers 13, when thrown outwardly under the centrifugal force. The springs 9 and studs 6 are located at the apex of the V formation. The clutch levers 13 are operated to throw out the clutch by means of a throw-out collar 20 slidably mounted on the clutch shaft 3. This collar is so located that there is a space between the inner ends of the throw-out levers and the collar, when the clutch is engaged, which space must be taken up before the throw-out levers can be actuated. As here shown, the levers 17 thrust in opposite directions against the springs 9 and the pressure ring, and as here shown, said levers thrust at 21 against a cup 12 and at 22 against the pressure ring at the rim thereof. Either of these two points may be considered a fulcrum and the other the work delivery point.

In operation, as the inner ends of the levers move outwardly under the action of the centrifugal force, they encounter the lapping ends of the levers 17 and press them outwardly, causing them to fulcrum or press at 21 and at 22, and in so doing, these levers are tilted at the point 21 and compress the springs 9, thus augmenting the action of the springs, as the centrifugal force increases under the rotation of the clutch. The arms 17 may be resilient or leaf or flat spring arms. The arms 17 also hold the inner ends of the throw-out levers from contacting with the throw-out collar 10, except when the throw-out collar is operated by the clutch pedal to disengage the clutch.

What I claim is:

1. In a friction clutch including driving and driven elements including a pressure ring, spring means acting on the pressure ring and loaded to press the ring to engage the clutch, radially-extending throw-out levers having their inner ends normally free to be acted upon outwardly by centrifugal force; the combination of means for transferring the action of the levers under the centrifugal force to the pressure ring in such direction as to augment the springs, said transfer means including levers having their inner ends lapping the inner arms of the throw-out levers in order to be pressed outwardly thereby during the movement of the levers under the centrifugal force and having their outer ends fulcrumed to thrust against the spring means to additionally load the same as the speed of the clutch increases, when the clutch is engaged.

2. In a friction clutch including driving and driven elements, the driving element including a pressure ring, spring means spaced apart in a circumferential direction acting on the pressure ring and loaded to press the ring to engage the clutch, and radially-extending, throw-out levers fulcrumed on the pressure ring and having their inner ends normally free to be acted upon and shifted outwardly by the centrifugal force caused by the rotation of the clutch, the combination of means for transferring the action of the inner arms of the levers under the centrifugal force when the clutch is rotating and engaged to the pressure ring, in such direction as to augment the springs, the transfer means including levers spaced circumferentially from the throw-out levers and having arms arranged to be engaged by the inner arms of the throw-out levers when the throw-out levers are acted upon by the centrifugal force.

3. In a friction clutch including driving and driven elements, the driving element including a pressure ring, spring means spaced apart in a circumferential direction acting on the pressure ring and loaded to press the ring to engage the clutch, and radially-extending, throw-out levers fulcrumed on the pressure ring and having their inner ends normally free to be acted upon and shifted outwardly by the centrifugal force caused by the rotation of the clutch, the combination of means for transferring the action of the inner arms of the levers under the centrifugal force when the clutch is rotating and engaged to the pressure ring, in such direction as to augment the springs, the transfer means including levers having arms arranged to be engaged by the inner arms of the throw-out levers when the throw-out levers are acted upon by the centrifugal force and being fulcrumed to additionally load the springs as the rotative speed of the clutch increases.

4. In a friction clutch including driving and driven elements, the driving element including a pressure ring, spring means spaced apart in a circumferential direction acting on the pressure ring and loaded to press the ring to engage the clutch, and radially-extending, throw-out levers fulcrumed on the pressure ring and having their inner ends normally free to be acted upon and shifted outwardly by the centrifugal force caused by the rotation of the clutch, the combination of means for transferring the action of the inner arms of the levers under the centrifugal force when the clutch is rotating and engaged to the pressure ring, in such direction as to augment the springs, said transfer means being V-shaped levers, each arm of the V formation being arranged in the path of one of the throw-out levers to be actuated thereby under the centrifugal force, the apex of the V coacting with one of the spring means and the pressure ring at spaced apart points, the V-shaped levers fulcruming on one and thrusting against the other of the same.

5. A friction clutch including a driving element and a driven element, a pressure ring, studs extending through the margin of the pressure ring into the driving element, the pressure ring being slidably mounted on the studs, the studs having heads at their outer ends, loaded compression springs to engage the clutch between the heads and the pressure ring, radially-extending, throw-out levers having their inner ends normally free to be thrown outwardly by the centrifugal force caused by the rotation of the clutch, and additional levers having arms arranged to be engaged by the throw-out levers under the action of the centrifugal force of the rotating clutch, when engaged, the additional levers extending between the inner ends of the springs and the pressure ring and thrusting at one point against the springs and at another point spaced therefrom against the pressure ring.

6. A friction clutch including a driving element and a driven element, a pressure ring member, studs extending through the margin of the pressure ring member into the driving element, the pressure ring member being slidably mounted on the studs, the studs having head members at their outer ends, springs to engage the clutch thrusting in opposite direction toward the head member and the pressure ring member, radially-extending, throw-out levers having their inner ends normally free to be thrown outwardly by the centrifugal force caused by the rotation of the clutch, when engaged, additional levers having arms arranged to be engaged by the throw-out levers under the action of the centrifugal force of the rotating clutch, when engaged, the additional levers extending between like ends of the springs and one of said members and thrusting at one point against the springs and at another point against one of said members.

CHARLES B. SPASE.

REFERENCES CITED

The following references are of record in the file of this patent:

UNITED STATES PATENTS

| Number | Name | Date |
| --- | --- | --- |
| 1,513,203 | Wemp | Oct. 20, 1924 |
| 1,855,643 | Matthews | Apr. 26, 1932 |
| 2,126,149 | Spase | Aug. 9, 1938 |
| 2,171,385 | Zeidler | Aug. 29, 1939 |
| 2,174,317 | Dunkelow | Sept. 26, 1939 |
| 2,195,354 | Bateman | Mar. 26, 1940 |
| 2,253,294 | Higgs | Aug. 19, 1941 |
| 2,405,357 | Jarrett | Aug. 6, 1946 |